S. D. SPENCE.
Appliance for Horses Hoofs.

No. 230,155.                    Patented July 20, 1880.

Witnesses:
John A. Hughes
F. E. Zerbe

Inventors:
Sidney D. Spence,
By J. S. Zerbe
Atty

UNITED STATES PATENT OFFICE.

SIDNEY D. SPENCE, OF ST. BERNARD, OHIO.

APPLIANCE FOR HORSES' HOOFS.

SPECIFICATION forming part of Letters Patent No. 230,155, dated July 20, 1880.

Application filed December 19, 1879.

*To all whom it may concern:*

Be it known that I, SIDNEY D. SPENCE, of St. Bernard, in the county of Hamilton and State of Ohio, have invented a new and useful Improvement in Appliances for Curing Cracks in Horses' Hoofs, which improvement is fully set forth in the following specification and accompanying drawings, in which—

Figure 1:
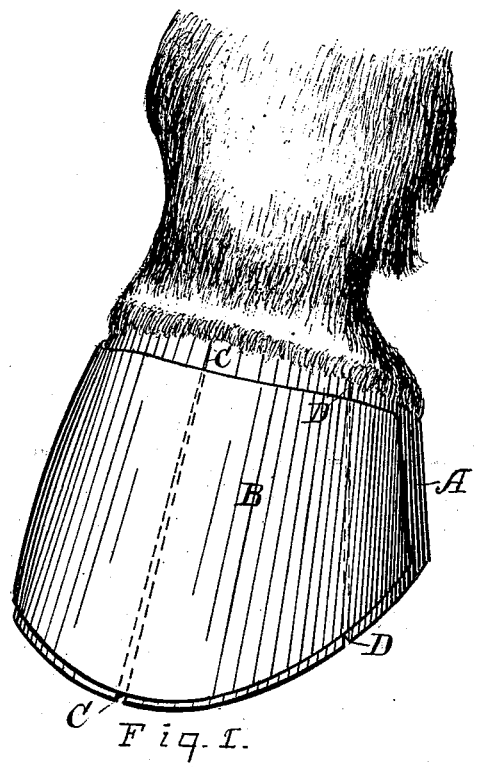
Figure 2:
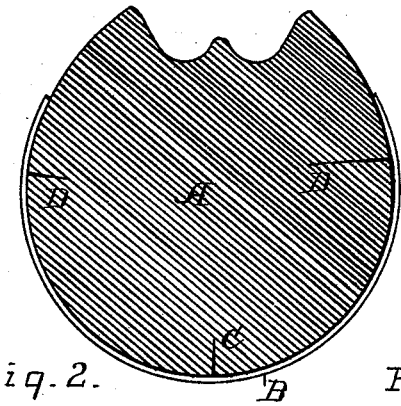
Figure 3:
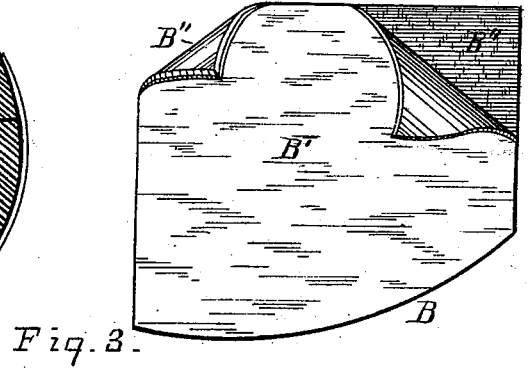

Figure 1 is a perspective elevation, showing the appliance attached to a hoof. Fig. 2 is a horizontal cross-section of the hoof; and Fig. 3 is one of the appliances, showing its formation.

In the treatment of cracks in hoofs of horses it is customary to apply salves or ointments for healing the same. The hoof is exposed and dirt is forced into the cracks, irritating the affected portions and preventing healing. In addition to this, the hoof is left free to open still wider and expose the inner part of the hoof.

The object of this invention is to provide an appliance which is to be covered over the hoof at the point or points where the hoof may be cracked, as will hereinafter be more fully set forth.

In the accompanying drawings, A represents the hoof, and B the appliance cemented around the hoof, covering the half-crack C in front, and the quarter-cracks D D at the sides.

In manufacturing the appliance B, I form it, preferably, of two parts, the outer part, B', being of sheet metal, and the inner part, B'', of leather or other yielding substance. These two parts are then firmly united by rivets or otherwise. When thus constructed the inner part, B'', is connected to the hoof, as shown in Fig. 1.

The object in constructing this appliance in the manner described is as follows: If made of leather alone there is too much pliability, and the hoof is liable to yield at the cracked part, whereas the object is to cement the hoof to a substance which is firm and unyielding. Sheet metal might be used for this purpose, but it could not be connected to the hoof; hence I have united the two, as shown.

It is my design, in applying the part B'' to the hoof, to allow it to remain on the hoof until it has fully grown out, the lower portion of the parts B' B'' gradually wearing off as the hoof does, and, when found necessary, additional pieces can be added above as the hoof grows down. This appliance keeps the hoof firm and prevents the cracks from enlarging, as well as protecting it from dirt.

Having described my invention, what I claim as new, and desire to secure by Letters Patent, is—

The bandage B, composed of the sheet-metal part B', riveted or otherwise attached to the part B'', composed of leather or other like pliable substance, when used as a bandage around a horse's hoof, in the manner and for the purpose herein described.

In testimony that I claim the foregoing I have hereunto set my hand this 11th day of December, A. D. 1879, in the presence of witnesses.

SIDNEY D. SPENCE, M. D.

Witnesses:
APOLLONIA KORN,
SEBASTIAN KORN.